(12) United States Patent
Jagota et al.

(10) Patent No.: US 12,430,137 B1
(45) Date of Patent: Sep. 30, 2025

(54) PROCESSOR WITH OPPORTUNISTIC BYPASS OF DISPATCH BUFFER AND RESERVATION STATION

(71) Applicant: Tenstorrent USA, Inc., Austin, TX (US)

(72) Inventors: Divyansh Jagota, Raleigh, NC (US); Manan R Salvi, San Jose, CA (US); Vignyan Kothinti, Redmond, WA (US); Wei-han Lien, Saratoga, CA (US)

(73) Assignee: Tenstorrent USA, Inc.

( * ) Notice: Subject to any disclaimer, the term of this patent is extended or adjusted under 35 U.S.C. 154(b) by 0 days.

(21) Appl. No.: 18/811,880

(22) Filed: Aug. 22, 2024

Related U.S. Application Data (60) Provisional application No. 63/566,300, filed on Mar. 17, 2024.

(51) Int. Cl.
*G06F 9/38* (2018.01)

(52) U.S. Cl.
CPC .......... *G06F 9/3867* (2013.01); *G06F 9/3836* (2013.01)

(58) Field of Classification Search
CPC .............................. G06F 9/3867; G06F 9/3836
See application file for complete search history.

(56) References Cited

U.S. PATENT DOCUMENTS

| | | | |
|---|---|---|---|
| 5,805,852 A | 9/1998 | Nakanishi | |
| 2007/0266387 A1 | 11/2007 | Henmi | |
| 2011/0314473 A1 | 12/2011 | Yang et al. | |
| 2012/0159217 A1 | 6/2012 | Venkataramanan et al. | |
| 2015/0026685 A1* | 1/2015 | Spadini | G06F 9/30043 712/216 |
| 2015/0178220 A1* | 6/2015 | Grubisic | G06F 12/1027 711/202 |
| 2017/0090934 A1 | 3/2017 | Di et al. | |
| 2017/0315814 A1 | 11/2017 | Smith et al. | |
| 2019/0304055 A1 | 10/2019 | Vembu et al. | |
| 2021/0216327 A1 | 7/2021 | Tekmen et al. | |

OTHER PUBLICATIONS

Ham, "Dynamic Scheduling in Multicore Processors," A thesis submitted to the University of Manchester for the degree of Doctor of Philosophy in the Faculty of Engineering and Physical Sciences, 2011, [Shortened, pp. 1, 43-45] Available at: https://research.manchester.ac.uk/en/studentTheses/dynamic-scheduling-in-multicore-processors.

(Continued)

*Primary Examiner* — William B Partridge
(74) *Attorney, Agent, or Firm* — Daylight Law, P.C.

(57) ABSTRACT

Systems and methods related to a processor with opportunistic bypass of dispatch buffer and reservation station are disclosed herein. The microarchitecture of the processor can determine when conditions exist for the dispatch buffers, reservation station, or other components of an instruction pipeline, to be bypassed by an instruction. One or more components may be bypassed after at least a portion of the instruction pipeline is flushed or ignored. Instructions may bypass one or more components if the source operands of the instruction are ready, there is sufficient space at the destination bypass path, and if the bypassed component is empty. Systems and methods as disclosed herein may improve the efficiency of processing instructions and reduce penalties for branch interpretations and other errors.

14 Claims, 7 Drawing Sheets

(56) References Cited

OTHER PUBLICATIONS

International Search Report and Written Opinion dated Jul. 18, 2025 from International Application No. PCT/US25/20171, 13 pages.
Voss et al., "Using Tasks to Create Your Own Algorithms," Pro TBB, Apress, 2019. [Shortened, pp. 277, 297-298] Available at: http://dx.doi.org/10.1007/978-1-4842-4398-5_10.

\* cited by examiner

PROCESSOR WITH OPPORTUNISTIC BYPASS OF DISPATCH BUFFER AND RESERVATION STATION

CROSS REFERENCE TO RELATED APPLICATIONS

This application claims the benefit of U.S. Provisional Patent Application No. 63/566,300, filed Mar. 17, 2024, which is incorporated by reference herein in its entirety for all purposes.

BACKGROUND

Processor core microarchitectures play a crucial role in determining the performance and efficiency of modern central processing units (CPUs). A processor core is the fundamental processing unit within a CPU, and its microarchitecture defines the organization and design principles that govern its operation. The microarchitecture of a CPU includes components that are tasked with executing instructions using the computational units of the CPU. The components include those that are tasked with processing high-level instructions into micro-operations that can be conducted by the computational unit. These components also include components that are tasked with scheduling the instructions for execution. Scheduling the instructions for execution can broadly involve determining which instructions can be executed before other instructions and assuring that the pipeline for processing the instructions is constantly filled so that the computational units are not idle. A portion of this work can include predicting if branching instructions will lead to a branching of the program being executed. The prediction is conducted such that the instruction pipeline can continue to fetch and begin to preprocess the instructions that the computational units will soon be required to execute.

While the inventions disclosed herein are broadly applicable to micro-architectures generally, there are several components of processor architectures which are discussed herein for the sake of explanation. These components include the mapper, the dispatch buffer, the reservation station, and the scheduler of the processor's instruction pipeline. The mapper is responsible for translating high-level instructions into micro-operations that the processor can execute. It plays a crucial role in managing the flow of instructions through the pipeline. The dispatch buffer serves as a temporary storage unit for micro-operations before they are sent to the execution units, facilitating efficient scheduling and execution. The dispatch buffer can include or be followed by a scheduler. The scheduler determines the order in which instructions are sent from the reservation station to the functional processing units of the processor. This helps in optimizing instruction execution by allowing out-of-order execution and mitigating potential bottlenecks. The synergy between these components within the microarchitecture enhances the overall efficiency and throughput of the processor core, enabling it to handle diverse workloads with improved performance. As such, improvements to the throughput capabilities of these components result in significant improvements to the overall processor architecture.

SUMMARY

This disclosure describes systems and methods related to processing cores with microarchitectures supporting opportunistic bypass of components in the instruction pipeline. The components in the instruction pipeline can include the dispatch buffers and reservation stations of the instruction pipeline. In specific embodiments of the invention, the microarchitecture can determine when conditions exist for the dispatch buffers, reservation station, or other components of the instruction pipeline, to be bypassed by an instruction without leading to pipeline stalls, out-of-order execution, or other instruction pipeline errors. Specific embodiments of the inventions disclosed herein are particularly applicable to situations in which a branch prediction error occurs, or some other error occurs in which at least a portion of the instruction pipeline may be flushed or ignored. When such an error occurs, it is common for the pipeline to need to be cleared and fetching restarted. Consequently, every instruction in the subsequent fetch bundle must traverse each pipeline stage anew. This scenario creates a chance for incoming ready instructions to be expedited to execution by bypassing unloaded components, thereby effectively reducing the penalty of branch mispredictions and other similar errors. Using the approaches disclosed herein, the processor architecture can be configured to determine, using logic gates, registers, and other hardware coupled to the instruction pipeline, if certain conditions occur; and certain actions may proceed based on the certain conditions occurring.

In specific embodiments of the invention, instructions are eligible for bypassing the dispatch buffers if the source operands of the instruction are ready and there is sufficient space in the reservation station. In specific embodiments of the invention, if the dispatch buffer is empty and the reservation station has space available for incoming operations, the dispatch buffer can be bypassed, and an instruction can be provided to the reservation station from the mapper.

In specific embodiments of the invention, instructions are eligible for bypassing the reservation station if the source operands of the instruction are ready and there is sufficient space in the functional units of the processor. In specific embodiments of the invention, if there is nothing to be selected from the reservation station, the scheduler can be bypassed, and the output of the dispatch buffer can be provided to the functional processing units of the processor. In specific embodiments of the invention, the reservation station can be bypassed by providing instructions directly from the dispatch buffer to the functional processing units using a delayed reservation station ready signal. The delayed reservation station ready signal can be a signal that has been passed through a delay circuit or clocked latch and that informs the processor that the reservation station is ready. These embodiments may enable younger operations, which are ready for execution, to bypass older instructions. Processes, methods, and devices as disclosed herein may improve efficiency of processing instructions and may reduce penalties for branch interpretations and other errors.

In specific embodiments of the invention, an instruction pipeline for one or more processors is provided. The instruction pipeline comprises: a scheduler; a multiplexer coupled to an output of the scheduler; a scheduler bypass path coupled to the multiplexer; and a logic circuit providing a control signal to the multiplexer to control the multiplexer to pass an instruction on the scheduler bypass path when the scheduler is empty.

In specific embodiments of the invention, an instruction pipeline for one or more processors is provided. The instruction pipeline comprises: a dispatch buffer; a multiplexer coupled to an output of the dispatch buffer; a dispatch buffer bypass path coupled to the multiplexer; and a logic circuit providing a control signal to the multiplexer to control the multiplexer to pass an instruction on the dispatch buffer bypass path when the dispatch buffer is empty and a full set of operands for the instruction are available in one or more operand registers of an execution area of the instruction pipeline.

In specific embodiments of the invention, a method is provided. The method comprises: detecting that a scheduler is empty; signaling, based at least in part on detecting that the scheduler is empty, a control signal to a multiplexer, the multiplexer being coupled to an output of the scheduler; and passing, based at least in part on signaling the control signal, an instruction on a scheduler bypass path, the scheduler bypass path being coupled to the multiplexer.

BRIEF DESCRIPTION OF THE DRAWINGS

The accompanying drawings illustrate various embodiments of systems, methods, and various other aspects of the disclosure. A person with ordinary skills in the art will appreciate that the illustrated element boundaries (e.g., boxes, groups of boxes, or other shapes) in the figures represent one example of the boundaries. It may be that in some examples one element may be designed as multiple elements or that multiple elements may be designed as one element. In some examples, an element shown as an internal component of one element may be implemented as an external component in another, and vice versa. Furthermore, elements may not be drawn to scale. Non-limiting and non-exhaustive descriptions are described with reference to the following drawings. The components in the figures are not necessarily to scale, emphasis instead being placed upon illustrating principles.

DETAILED DESCRIPTION

Reference will now be made in detail to implementations and embodiments of various aspects and variations of systems and methods described herein. Although several exemplary variations of the systems and methods are described herein, other variations of the systems and methods may include aspects of the systems and methods described herein combined in any suitable manner having combinations of all or some of the aspects described.

Different systems and methods for one or more processors with opportunistic bypass of dispatch buffer and reservation station in accordance with the summary above are described in detail in this disclosure. The methods and systems disclosed in this section are nonlimiting embodiments of the invention, are provided for explanatory purposes only, and should not be used to constrict the full scope of the invention. It is to be understood that the disclosed embodiments may or may not overlap with each other. Thus, part of one embodiment, or specific embodiments thereof, may or may not fall within the ambit of another, or specific embodiments thereof, and vice versa. Different embodiments from different aspects may be combined or practiced separately. Many different combinations and sub-combinations of the representative embodiments shown within the broad framework of this invention, which may be apparent to those skilled in the art but not explicitly shown or described, should not be construed as precluded.

Systems and methods related to processing cores with microarchitectures supporting opportunistic bypass of components in the instruction pipeline are disclosed herein. The components in the instruction pipeline can include the dispatch buffers and reservation stations of the instruction pipeline. In specific embodiments of the invention, the microarchitecture can determine when conditions exist for the dispatch buffers, reservation station, or other components of the instruction pipeline, to be bypassed by an instruction without leading to pipeline stalls, out-of-order execution, or other instruction pipeline errors. Specific embodiments of the inventions disclosed herein are particularly applicable to situations in which a branch prediction error occurs, or some other error occurs in which at least a portion of the instruction pipeline must be flushed or ignored. When such an error occurs, it is common for the pipeline to need to be cleared and fetching restarted. Consequently, every instruction in the subsequent fetch bundle must traverse each pipeline stage anew. This scenario creates a chance for incoming ready instructions to be expedited to execution by bypassing unloaded components, thereby effectively reducing the penalty of branch mispredictions and other similar errors.

In specific embodiments of the invention, an instruction pipeline includes, in order, a mapper, a dispatch buffer, a reservation station (or scheduler), and the functional units of the processor. These components are configured to execute their usual functions in an instruction pipeline as is known in the art and described in the background above. As such, when an instruction pipeline is referred to herein, such an instruction pipeline will be understood to include the components listed above in that order as is known in the art. However, using the approaches disclosed herein, the processor architecture can be configured to determine, using logic gates, registers, and other hardware coupled to the instruction pipeline, if certain conditions occur and to perform certain actions based on the certain conditions occurring.

In specific embodiments of the invention, instructions are eligible for bypassing the dispatch buffers if the source operands of the instruction are ready and there is sufficient space in the reservation station. The microarchitecture can be configured to determine if these conditions exist for instructions that are loaded in the mapper by being configured to read or mirror the values in the reservation station and the status registers for the source operands of the instruction. The instruction pipeline can include an additional wire or bus that bypasses the dispatch buffers by connecting the mapper to the reservation station directly. The additional wire or bus can be controlled by a multiplexer (MUX) or pass gate with control inputs that only couple the input to the output when the conditions mentioned above in this paragraph are met.

In specific embodiments of the invention, instructions are eligible for bypassing the reservation station if the source operands of the instruction are ready and there is sufficient space in the functional units of the processor. The microarchitecture can be configured to determine if these conditions exist for instructions that are loaded in the dispatch buffers by being configured to read or mirror the values in the dispatch buffers and the status registers for the source operands of the instructions. The instruction pipeline can include an additional wire or bus that bypasses the reservation station by connecting the dispatch buffers to the functional units directly. The additional wire or bus can connect the input of the reservation station to a register that will provide its output to the functional units of the processor during the next clock cycle. The additional wire or bus can be controlled by a MUX or pass gate with control inputs that only couple the input to the output when the conditions mentioned above in this paragraph are met.

In specific embodiments of the invention, if there is nothing to be selected from the reservation station, the scheduler can be bypassed, and the output of the dispatch buffer can be provided to the functional processing units of the processor. The microarchitecture can determine that there is a null value in the reservation station and send a control signal to a MUX or pass gate such as the ones described in the prior paragraph that control the flow of data on a wire or bus connecting the input of the scheduler to the input of the functional processing units. The null value can indicate that the reservation station is empty or that the reservation station does not have any ready instructions. A ready instruction may be an instruction whose source operands are either produced or are intermediates.

In specific embodiments of the invention, if the dispatch buffer is empty and the reservation station has space available for incoming operations, the dispatch buffer can be bypassed, and an instruction can be provided to the reservation station from the mapper. The microarchitecture can determine that there is a null value in the dispatch buffer and send a control signal to a MUX or pass gate such as the ones described in the paragraphs above that control the flow of data on a wire or bus connecting the input of the dispatch buffer to the input of the reservation station. The null value can indicate that the dispatch buffer is empty or that it doesn't have any instructions that are ready or capable of being delivered to the functional processing units of the architecture (e.g., no instructions of a particular affinity).

In specific embodiments of the invention, the reservation station can be bypassed by providing instructions directly from the dispatch buffer to the functional processing units using a delayed reservation station ready signal. The delayed reservation station ready signal can be a signal that usually informs the processor that the reservation station is ready that has been passed through a delay circuit or clocked latch. The delayed reservation station ready signal can be used as the control input to a MUX or pass gate that couples the output of the dispatch buffer to the input of the functional processing units. These embodiments may enable younger operations, which are ready for execution, to bypass older instructions receiving Physical Register Number (PRN) broadcast in the current cycle. A PRN broadcast is a wakeup signal from the producer instruction to the consumer instruction that its source operand is ready.

Figure 1:
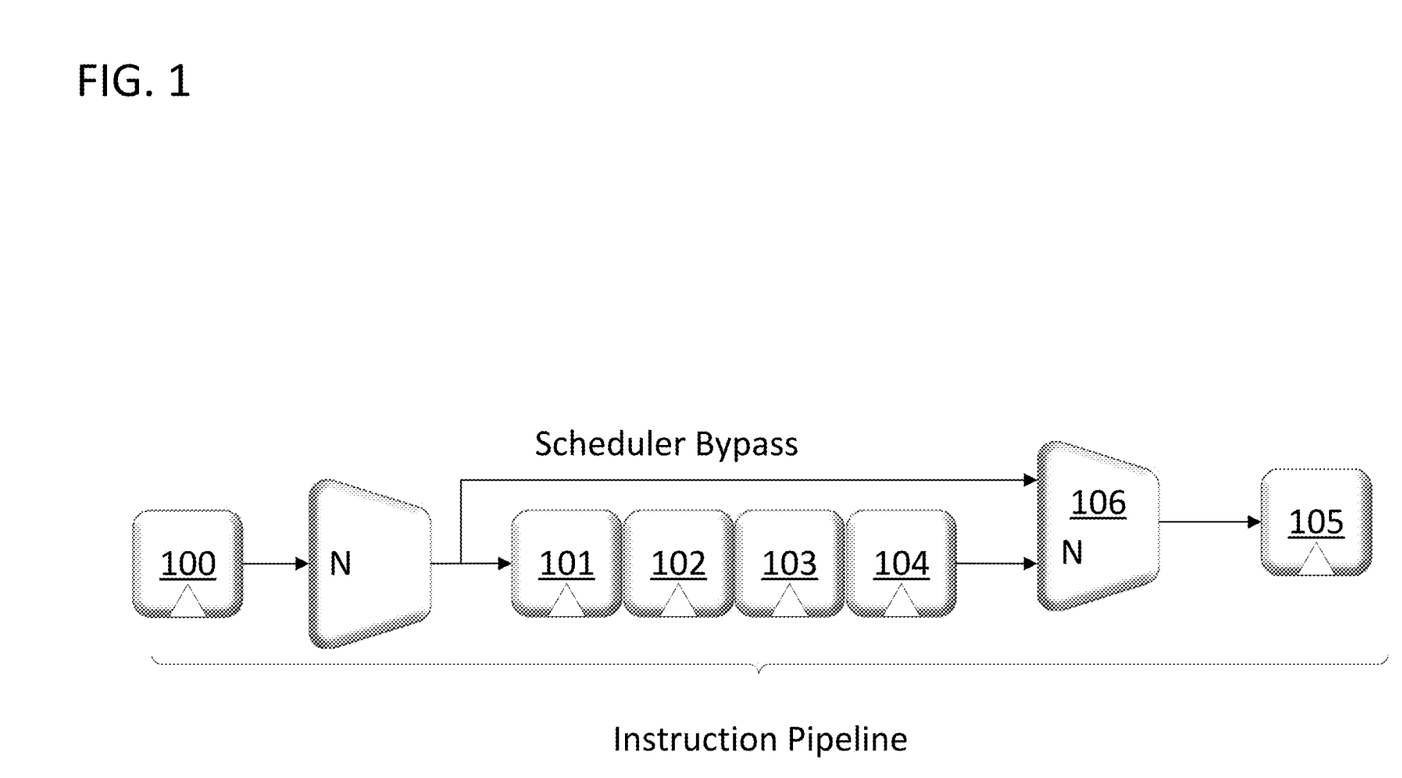
FIG. 1 provides an instruction pipeline that may be a physical pipeline (e.g., a source (SRC) or destination (DEST) physical pipeline) of the functional processing units, the physical pipeline includes a respective scheduler bypass path in accordance with specific embodiments of the inventions disclosed herein.

FIG. 1 illustrates an instruction pipeline, which may be a physical pipeline. The instruction pipeline may act as a source (SRC) or a destination (DEST) physical pipeline of the functional processing units. The dispatch buffer 100 has multiple entries that are passed to a multiplexer (MUX). From the multiplexer, the instructions from the dispatch buffer 100 are passed to a set of latches 101-104 in a row, which provide the scheduler functionality of the pipeline in which the age of every instruction can be maintained in a schedule. When an instruction is picked from the scheduler, it is passed through another MUX to the broadcast latch 105 from where it is then sent on to the functional units of the processor. The figure also includes a scheduler bypass path. This allows instructions to be passed directly from the output of dispatch buffer 100 to the broadcast path. This can be done when the system detects that the scheduler is empty or does not have any ready instructions. For example, after a branch prediction miss, the scheduler may need to be flushed. The microarchitecture can then detect that the scheduler is empty or does not have any ready instructions and pass an instruction directly from the dispatch buffer output to the broadcast path, bypassing the scheduler. While the bypass path is shown as a line, the bypass path can include a separate MUX or control gate. Alternatively, MUX 106 can be provided with the control signals required to utilize the scheduler bypass path instead of providing an instruction to the scheduler. In specific embodiments of the invention, MUX 106 can be provided with a control signal that is a latched version of the signal that determines if the scheduler is empty or does not have any ready instructions. In other words, the scheduler may be determined to be empty during a first clock cycle, and a control signal could be generated accordingly in the same clock cycle. This control signal can then be provided to a latch (e.g., latched) such that the scheduler bypass path is used on the next clock cycle. This approach provides certain benefits in specific implementations in that it helps in reduction of the pipeline depth opportunistically.

Figure 2:
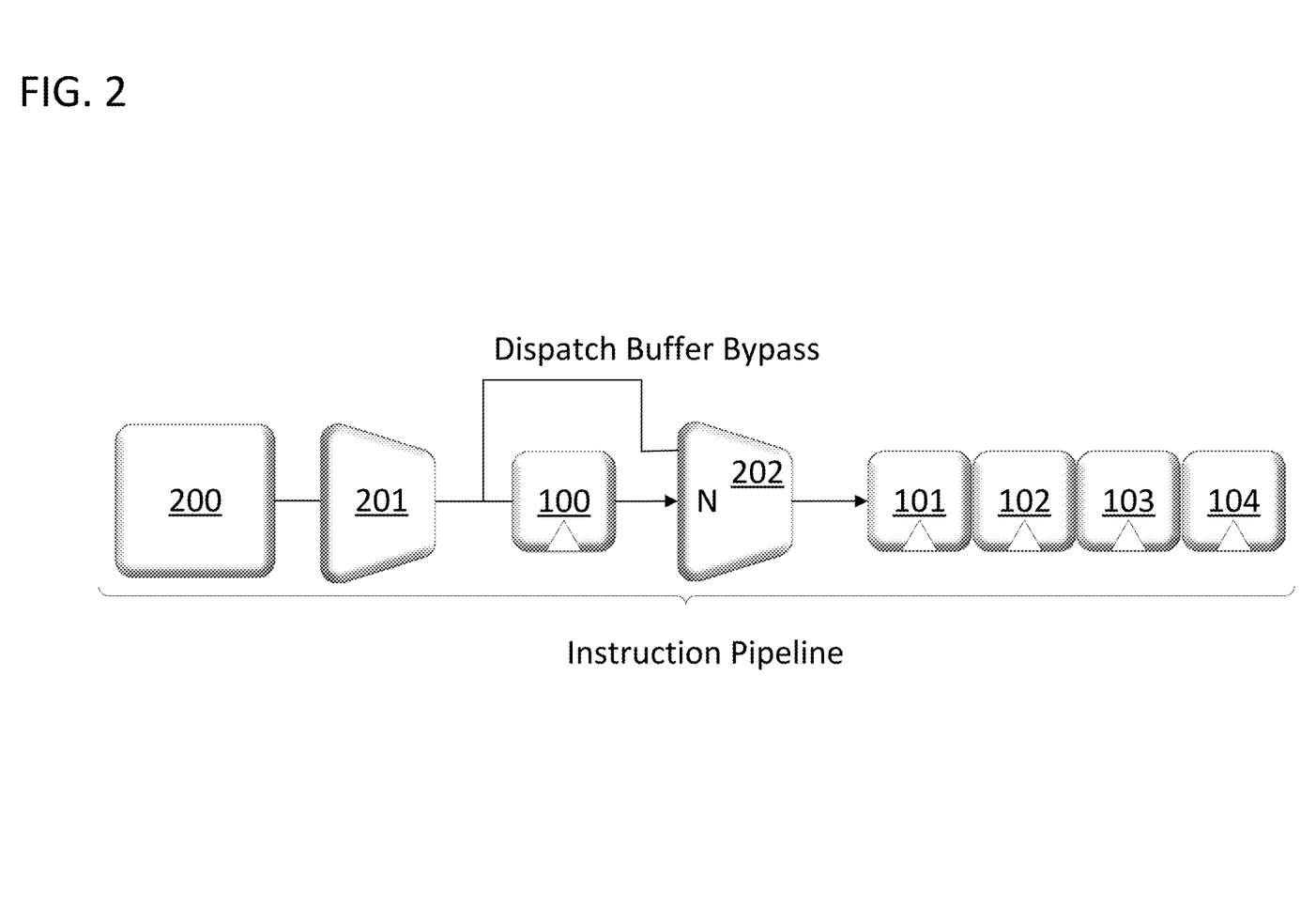
FIG. 2 provides an instruction pipeline that may be a physical pipeline (e.g., a source or destination physical pipeline) of the functional processing units, the physical pipeline includes a respective dispatch buffer bypass path in accordance with specific embodiments of the inventions disclosed herein.

FIG. 2 illustrates an instruction pipeline, which may be a physical pipeline. The instruction pipeline may act as a source (SRC) or a destination (DEST) physical pipeline of the functional processing units. The dispatch mapper 200 has multiple entries that are passed to a multiplexer. From the multiplexer, the instructions from the dispatch mapper 200 are passed to a set of latches 101-104 in a row, which provide the scheduler functionality of the pipeline in which the age of every instruction can be maintained in a schedule. When an instruction is picked from the scheduler, it is passed through another MUX to the broadcast latch from where it is then sent on to the functional units of the processor. The figure also includes a dispatch buffer bypass path. This allows instructions to be passed directly from the output of dispatch mapper 200 via MUX 201 directly to the schedulers. This can be done when the system detects that the dispatch buffer is empty or that the dispatch buffer does not have any instructions that are capable of being sent to the functional processing units of the architecture (e.g., no instruction of an available affinity). In specific embodiments, the system must also detect that the operands for the instruction are available before allowing an instruction to bypass the dispatch buffer. While the bypass path is shown as a line, the bypass path can include a separate MUX or control gate. Alternatively, MUX 202 can be provided with the control signals required to utilize the dispatch buffer bypass path instead of providing an instruction directly to the scheduler. In specific embodiments of the invention, an instruction pipeline can include both a scheduler bypass path and a dispatch buffer bypass path as illustrated in FIGS. 1 and 2.

Figure 3:
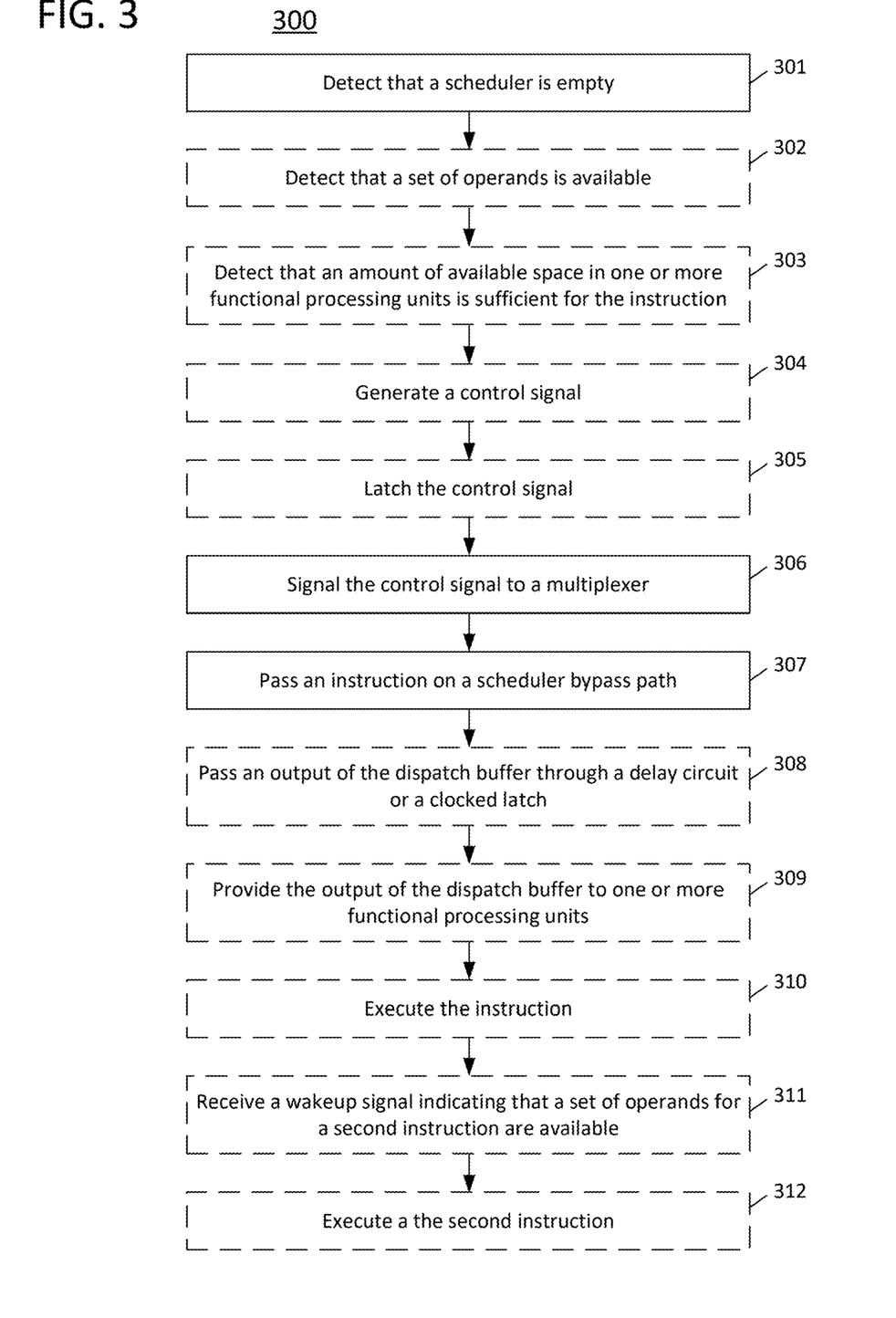
FIG. 3 provides an example of a method of an instruction bypassing a scheduler in an instruction pipeline in accordance with specific embodiments of the inventions disclosed herein.

FIG. 3 illustrates an example of method 300 of an instruction bypassing a scheduler in an instruction pipeline in accordance with specific embodiments of the inventions disclosed herein. Method 300 may be executed by a system including one or more processors, a scheduler, a multiplexer, a scheduler bypass path, and one or more logic circuits. Method 300 may be executed by one or more processors in accordance with instructions stored by a non-transitory computer-readable medium. Steps 301 through 311 of method 300 (or portions of steps 301 through 311) may be rearranged, omitted, or duplicated.

At step 301, the emptiness of the scheduler of the instruction pipeline may be detected. In other words, the system may detect that the scheduler of the instruction pipeline is empty. Alternatively, the scheduler may not be empty, but may not have any instructions that are ready to be sent to the processors (e.g., functional processing units). The system may detect that the scheduler is empty during a first clock cycle.

In specific embodiments, at step 302, the availability of a set of operands may be detected. In other words, the system may detect that the set of operands is available. The set of operands may be associated with the instruction. The set of operands may be available in one or more operand registers.

In specific embodiments, at step 303, the system may also detect that there is sufficient space for the instruction at the one or more functional processing units.

In specific embodiments, at step 304, a control signal may be generated. The control signal may be generated during the first clock cycle. The control signal may be generated based on determining that the scheduler is empty (e.g., at step 301).

In specific embodiments, at step 305, the control signal may be latched. In other words, the system may provide the control signal to a latch. The control signal may be latched based at least in part on generating the control signal (e.g., at step 304).

At step 306, the control signal may be signaled to the multiplexer. The multiplexer may be coupled to an output of the scheduler. The control signal may be signaled based at least in part on the system detecting that the scheduler is empty (e.g., at step 301).

At step 307, the instruction may be passed on the scheduler bypass path. The scheduler bypass path may be coupled with the multiplexer. Passing the instruction on the scheduler bypass path may be based on signaling the control signal (e.g., at step 306). In specific embodiments, passing the instruction on the scheduler bypass path may be based on detecting that the set of operands for the instruction is available (e.g., at step 302) or on detecting that the amount of available space in the one or more functional processing units is sufficient for the instruction (e.g., at step 303). The instruction may be passed on the scheduler bypass path during a second clock cycle (e.g., a clock cycle after detecting that the scheduler is empty) based on the control signal being latched (e.g., at step 305). In specific embodiments, the instruction may be passed on the scheduler bypass path based on a branch prediction being incorrect or another error.

In specific embodiments, at step 308, an output of a dispatch buffer may be passed through a delay circuit or a clocked latch.

In specific embodiments, at step 309, an output of a dispatch buffer may be provided to one or more functional processing units. In specific embodiments, the output of the dispatch buffer may be delayed (e.g., at step 308).

In specific embodiments, at step 310, the instruction may be executed or may be ready to execute. The instruction may be executed (or ready to execute) during a third clock cycle.

In specific embodiments, at step 311, a wakeup signal may be received. The wakeup signal may be received during the third clock cycle or before the third clock cycle. The wakeup signal may indicate that a set of operands for a second instruction are available. The wakeup signal may be a PRN broadcast and may be from a producer instruction to a consumer instruction that its source operand is ready.

In specific embodiments, at step 312, the second instruction may be executed or may be ready to execute. The second instruction may be older than the instruction and may be executed (or ready to be executed) after the instruction is executed (or ready to be executed). Generally, in method 300, younger instructions (such as the instruction) may bypass older instructions (such as the second instruction). For example, younger operations, which are ready for execution, may bypass older instructions receiving PRN broadcast in the current cycle. By passing the instruction on the scheduler bypass path, the system may increase efficiency of processing instructions and reduce penalties for branch mispredictions and other similar errors.

Figure 4:
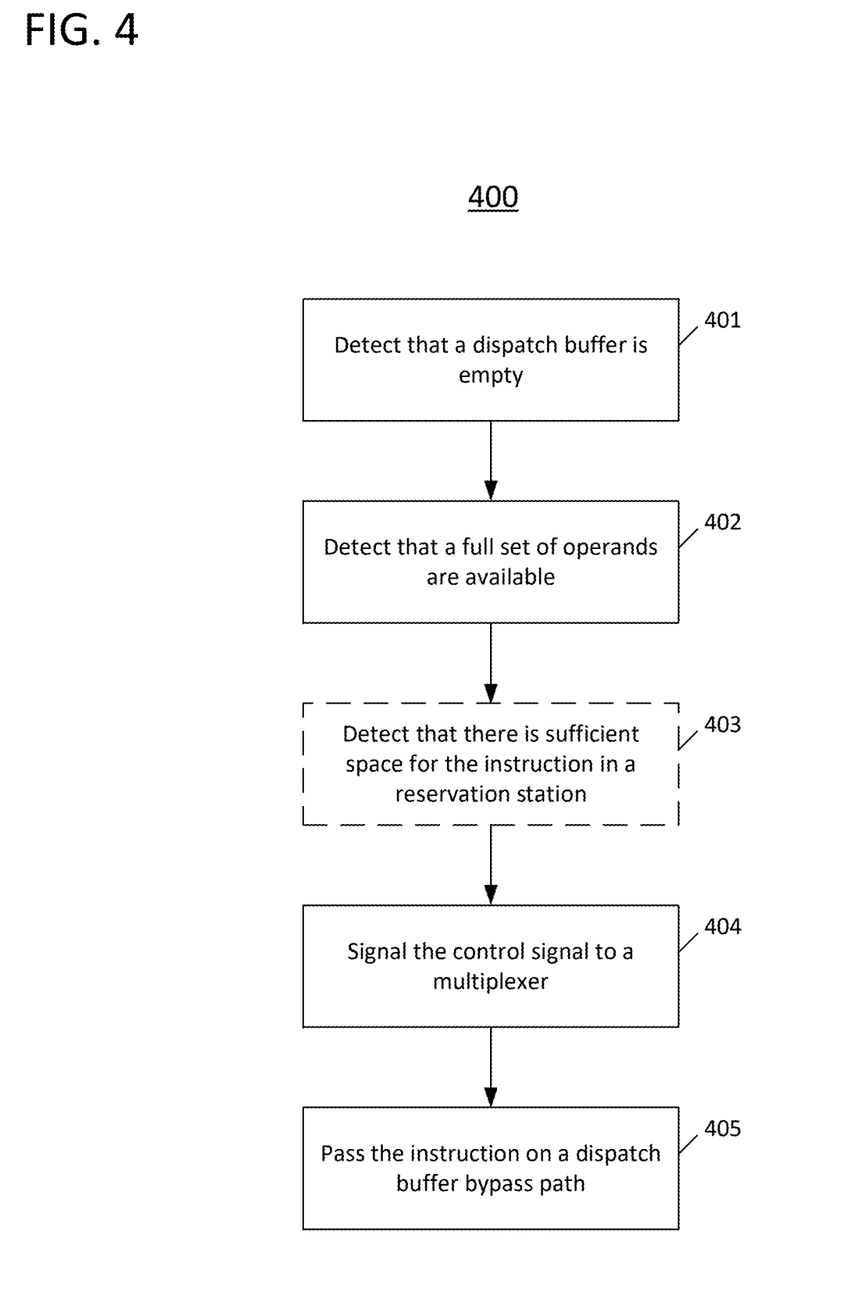
FIG. 4 provides an example of a method of an instruction bypassing a dispatch buffer in an instruction pipeline in accordance with specific embodiments of the inventions disclosed herein.

FIG. 4 illustrates an example of method 400 of an instruction bypassing a dispatch buffer in an instruction pipeline in accordance with specific embodiments of the inventions disclosed herein. Method 400 may be executed by a system including one or more processors, a dispatch buffer, a multiplexer, a dispatch buffer bypass path, and one or more logic circuits. Method 400 may be executed by one or more processors in accordance with instructions stored by a non-transitory computer-readable medium. Steps 401 through 405 of method 400 (or portions of steps 401 through 405) may be rearranged, omitted, or duplicated. Aspects of method 300 may be incorporated into method 400. The instruction pipeline may be a source (SRC) physical pipeline or a destination (DEST) physical pipeline.

At step 401, the emptiness of the dispatch buffer may be detected. In other words, the system may detect that a dispatch buffer is empty. The dispatch buffer may store a null value that indicates that the dispatch buffer does not contain any instructions that are ready to be delivered to the processors (e.g., functional processing units). Detecting that the dispatch buffer is empty may be based on the dispatch buffer storing the null value.

At step 402, the availability of a full set of operands may be detected. In other words, the system may detect that the full set of operands is available. The full set of operands may be associated with the instruction and may be available in one or more operand registers of an execution area of the instruction pipeline.

In specific embodiments, at step 403, the space for the instruction in a reservation may be detected as sufficient. In other words, the system may detect that there is sufficient space for the instruction in the reservation station.

At step 404, the control signal may be signaled. The control signal may be signaled to a multiplexer that is coupled to an output of the dispatch buffer. The control signal may be signaled based on detecting that the dispatch buffer is empty (e.g., at step 401) and detecting that the full set of operands are available (e.g., at step 402). In specific embodiments, the control signal may be signaled based on detecting that there is sufficient space for the instruction in the reservation station (e.g., at step 403). The instruction may be provided to the reservation station from a mapper. The reservation station may store values associated with the full set of operands.

At step 405, the instruction may be passed on a dispatch buffer bypass path. The dispatch buffer bypass path may be coupled to the multiplexer. The instruction may be passed on the dispatch buffer bypass path based on the control signal being signaled (e.g., at step 404). In specific embodiments, the instruction may be passed on the dispatch buffer bypass path based on the amount of space in the reservation station (e.g., detected at step 403). In specific embodiments, the instruction may be passed on the dispatch buffer bypass path based on a branch prediction being incorrect or another error. By passing the instruction on the dispatch buffer bypass path, the system may increase efficiency of processing instructions and reduce penalties for branch mispredictions and other similar errors.

Figure 5:
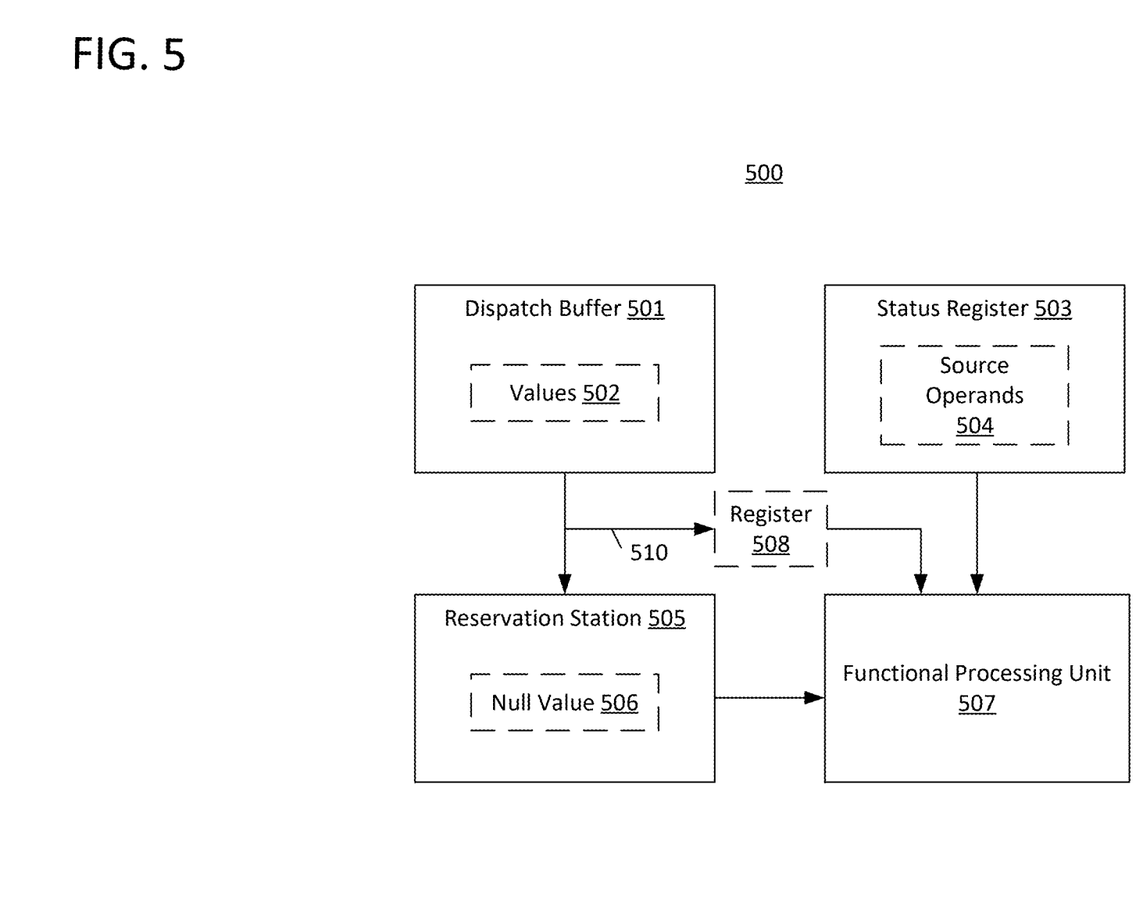
FIG. 5 provides an example of a system with an instruction optionally bypassing a reservation station in an instruction pipeline in accordance with specific embodiments of the inventions disclosed herein.

FIG. 5 illustrates an example of system 500 of an instruction optionally bypassing reservation station 505 in an instruction pipeline in accordance with specific embodiments of the inventions disclosed herein. System 500 may include dispatch buffer 501 storing values 502, status register 503 storing source operands 504 for the instruction, reservation station 505 storing null value 506, functional processing unit 507 of a processor, and bypass path 510. In specific embodiments, system 500 may include register 508. Reservation station 505 may also be referred to as a scheduler. Dispatch buffer 501 may include or incorporate one or more dispatch buffers. Functional processing unit 507 may include or incorporate one or more functional processing units. Status register 503 may include or incorporate one or more status registers.

An instruction may use bypass path 510 for bypassing reservation station 505 if source operands 504 of the instruction are ready, there is sufficient space in functional processing unit 507, and reservation station 505 is empty. The microarchitecture of the processor may be configured to determine whether these conditions are met for one or more instructions that are loaded in dispatch buffer 501 by being configured to read or mirror values 502 stored in dispatch buffer 501 and source operands 504 stored in status register 503, as well as detecting that reservation station 505 is empty.

The microarchitecture can determine that null value 506 is in reservation station 505 and send a control signal to a MUX or pass gate that control the flow of data on a wire or bus connecting the input of reservation station 505 (e.g., the output of dispatch buffer 501) to the input of functional processing unit 507. Null value 506 may indicate that reservation station 505 is empty or that reservation station 505 does not have any ready instructions.

In specific embodiments of the invention, if there is nothing to be selected from reservation station 505, reservation station 505 may be bypassed, and the output of dispatch buffer 501 may be provided to functional processing unit 507 via bypass path 510. The instruction pipeline may include a wire or bus (e.g., as part of bypass path 510) that bypasses reservation station 505 by connecting dispatch buffer 501 to functional processing unit 507 directly. In specific embodiments, bypass path 510 may connect the output of dispatch buffer 501 to register 508. The output of register 508 may be connected to functional processing unit 507, and the output of register 508 may be provided to functional processing unit 507 during the next clock cycle. In other words, register 508 may delay the output of dispatch buffer 501 for a clock cycle.

In specific embodiments of the invention, reservation station 505 may be bypassed by providing instructions directly from dispatch buffer 501 to the functional processing unit 507 using a delayed reservation station ready signal. The delayed reservation station ready signal may be a signal that usually informs the processor that reservation station 505 is ready and that has been passed through a delay circuit or clocked latch. The delayed reservation station ready signal may be used as the control input to a MUX or pass gate that couples the output of dispatch buffer 501 to the input of functional processing unit 507. These embodiments may enable younger operations, which are ready for execution, to bypass older instructions receiving PRN broadcast in the current cycle. A PRN broadcast is a wakeup signal from the producer instruction to the consumer instruction that its source operand is ready.

The wire or bus from dispatch buffer 501 to functional processing unit 507 (or to register 508 in specific embodiments) may be controlled by a MUX or pass gate with control inputs that only couple the output of dispatch buffer 501 to the input of functional processing unit 507 (or to register 508) when certain conditions are met. The certain conditions may be that source operands 504 of the instruction are ready, that there is sufficient space in functional processing unit 507, that reservation station 505 is effectively empty, or a combination thereof. By passing the instruction on bypass path 510, the system may increase efficiency of processing instructions and reduce penalties for branch mispredictions and other similar errors.

Figure 6:
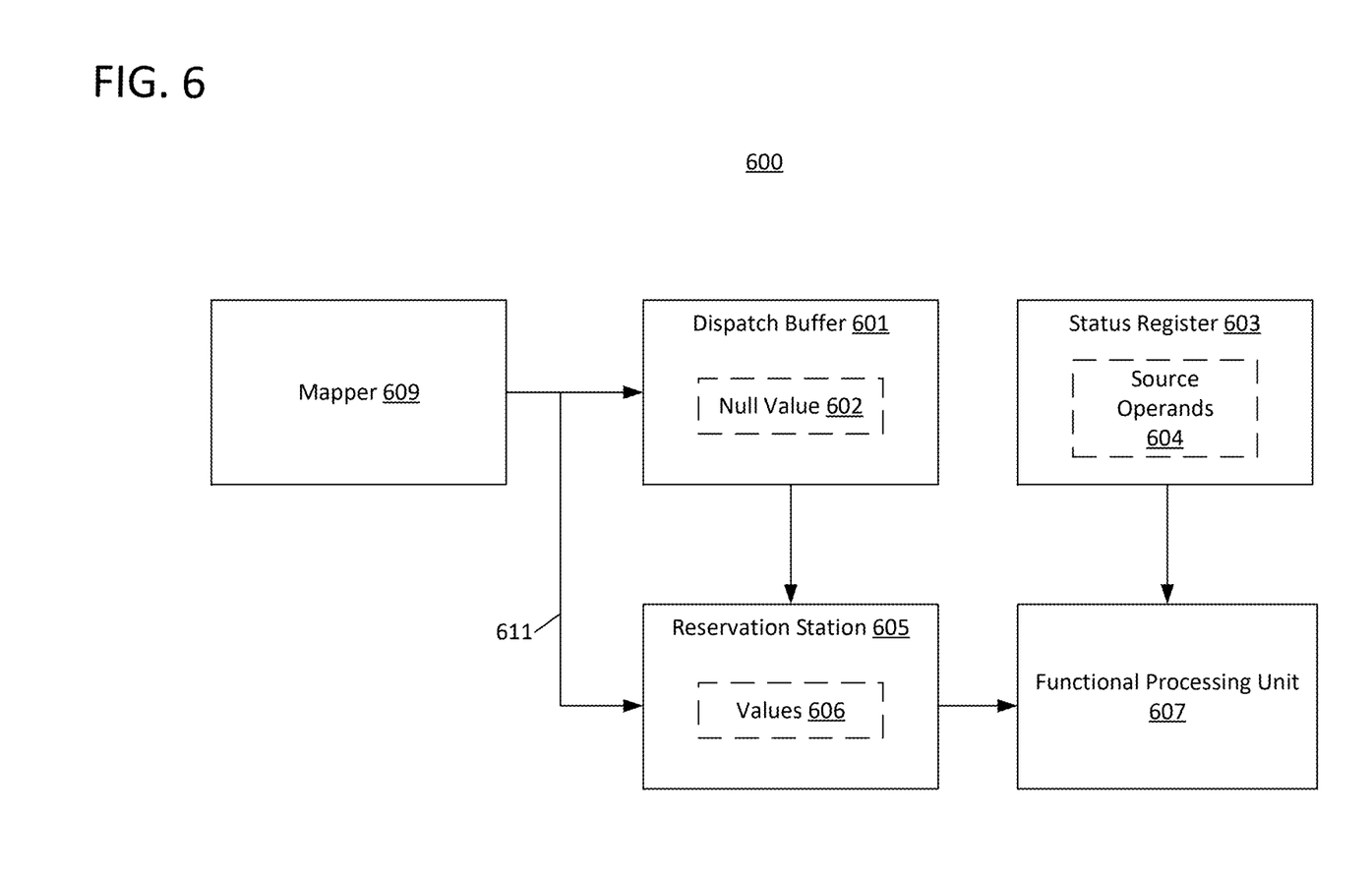
FIG. 6 provides an example of a system with an instruction optionally bypassing a dispatch buffer in an instruction pipeline in accordance with specific embodiments of the inventions disclosed herein.

FIG. 6 illustrates an example of system 600 optionally bypassing dispatch buffer 601 in an instruction pipeline in accordance with specific embodiments of the inventions disclosed herein. System 600 may include dispatch buffer 601 storing null value 602, status register 603 storing source operands 604 for the instruction, reservation station 605 storing values 606, functional processing unit 607 of a processor, mapper 609, and bypass path 611. Reservation station 605 may also be referred to as a scheduler. Dispatch buffer 601 may include or incorporate one or more dispatch buffers. Functional processing unit 607 may include or incorporate one or more functional processing units. Status register 603 may include or incorporate one or more status registers. System 600 may include aspects of system 500.

An instruction may use bypass path 611 for bypassing dispatch buffer 601 if source operands 604 of the instruction are ready, there is sufficient space in reservation station 605, and dispatch buffer 601 is empty. The microarchitecture can be configured to determine whether these conditions are met for instructions that are loaded in mapper 609 by being configured to read or mirror values 606 in reservation station 605 and source operands 604 in status register 603, as well as detecting that dispatch buffer 601 is empty.

The microarchitecture can determine that null value 602 is in dispatch buffer 601 and send a control signal to a MUX or pass gate that controls the flow of data on a wire or bus connecting the output of mapper 609 (e.g., the input of dispatch buffer 601) to the input of reservation station 605. Null value 602 may indicate that dispatch buffer 601 is empty or that dispatch buffer 601 does not have any instructions that are ready or capable of being delivered to functional processing unit 607 of the architecture (e.g., no instructions of a particular affinity). In specific embodiments of the invention, if dispatch buffer 601 is empty and reservation station 605 has space available for incoming operations, dispatch buffer 601 may be bypassed and an instruction can be provided to reservation station 605 from mapper 609.

The instruction pipeline may include a wire or bus (e.g., as part of bypass path 611) that bypasses dispatch buffer 601 by connecting mapper 609 to reservation station 605 directly. The bypass path 611 may be controlled by a MUX or pass gate with control inputs that only couple the output of mapper 609 to the input of reservation station 605 when certain conditions are met. The certain conditions may be that source operands 604 of the instruction are ready, that there is sufficient space in reservation station 605, that dispatch buffer 601 is effectively empty, or a combination thereof. By passing the instruction on bypass path 611, the system may increase efficiency of processing instructions and reduce penalties for branch mispredictions and other similar errors.

Figure 7:
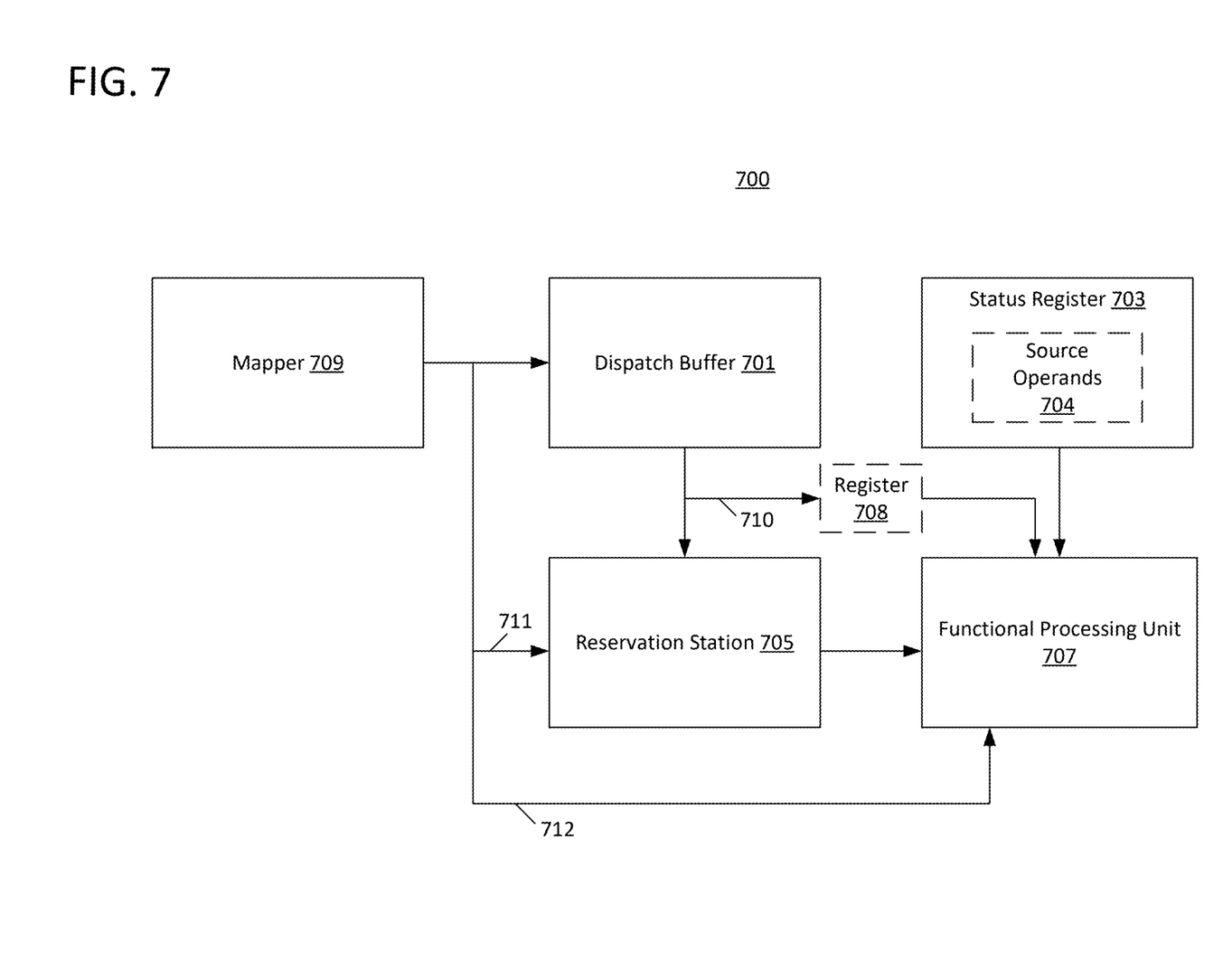
FIG. 7 provides an example of a system with an instruction optionally bypassing a reservation station, a dispatch buffer, or both in an instruction pipeline in accordance with specific embodiments of the inventions disclosed herein.

FIG. 7 illustrates an example of system 700 of an instruction optionally bypassing dispatch buffer 701 and optionally bypassing reservation station 705 in an instruction pipeline in accordance with specific embodiments of the inventions disclosed herein. System 700 may include dispatch buffer 701, status register 703 storing source operands 704 for the instruction, reservation station 705, functional processing unit 707 of a processor, mapper 709, bypass path 710, bypass path 711, and bypass path 712. In specific embodiments, system 700 may include register 708. Reservation station 705 may also be referred to as a scheduler. Dispatch buffer 701 may include or incorporate one or more dispatch buffers. Functional processing unit 707 may include or incorporate one or more functional processing units. Status register 703 may include or incorporate one or more status registers. Bypass path 710 may bypass reservation station 705. Bypass path 711 may bypass dispatch buffer 701. Bypass path 712 may bypass both reservation station 705 and dispatch buffer 701.

System 700 may include or incorporate aspects of both system 500 and system 600. Dispatch buffer 701 may correspond to dispatch buffers 501 and 601, status register 703 may correspond to status registers 503 and 603, source operands 704 may correspond to source operands 504 and 604, reservation station 705 may correspond to reservation stations 505 and 605, functional processing unit 707 may correspond to functional processing units 507 and 607, register 708 may correspond to register 508, mapper 709 may correspond to mapper 609, bypass path 710 may correspond to bypass path 510, and bypass path 711 may correspond to bypass path 611.

An instruction of system 700 may bypass reservation station 705 (e.g., use bypass path 710) if source operands 704 of the instruction are ready, there is sufficient space in functional processing unit 707, and there is nothing to be selected from reservation station 705. An instruction of system 700 may bypass dispatch buffer 701 (e.g., use bypass path 711) if source operands 704 of the instruction are ready, there is sufficient space in reservation station 705, and there is nothing to be selected from dispatch buffer 701. An instruction of system 700 may bypass both reservation station 705 and dispatch buffer 701 (e.g., use bypass path 712) if source operands 704 are ready, there is sufficient space in functional processing unit 707, there is nothing to be selected from dispatch buffer 701, and there is nothing to be selected from reservation station 705. In specific embodiments, bypass path 712 may include a delay circuit or register (e.g., register 708 or a register similar to register 708). By passing the instruction on bypass path 710, bypass path 711, or bypass path 712, the system may increase efficiency of processing instructions and reduce penalties for branch mispredictions and other similar errors.

At least one processor in accordance with this disclosure can include at least one non-transitory computer readable media. The at least one processor could comprise at least one computational node in a network of computational nodes. The media could include cache memories on the processor. The media can also include shared memories that are not associated with a unique computational node. The media could be a shared memory, could be a shared random-access memory, and could be, for example, a double data rate dynamic random-access memory (DDR DRAM). The shared memory can be accessed by multiple channels. The non-transitory computer readable media can store data required for the execution of any of the methods disclosed herein, the instruction data disclosed herein, and/or the operand data disclosed herein. The computer readable media can also store instructions which, when executed by the system, cause the system to execute the methods disclosed herein. The concept of executing instructions is used herein to describe the operation of a device conducting any logic or data movement operation, even if the "instructions" are specified entirely in hardware (e.g., an AND gate executes an "and" instruction). The term is not meant to impute the ability to be programmable to a device.

While the specification has been described in detail with respect to specific embodiments of the invention, it will be appreciated that those skilled in the art, upon attaining an understanding of the foregoing, may readily conceive of alterations to, variations of, and equivalents to these embodiments. Any of the method steps discussed above can be conducted by a processor operating with a computer-readable non-transitory medium storing instructions for those method steps. The computer-readable medium may be memory within a personal user device or a network accessible memory. Although examples in the disclosure were generally directed to instruction pipelines, the same approaches could be utilized to apply broadly to microarchitectures and architectures. These and other modifications and variations to the present invention may be practiced by those skilled in the art, without departing from the scope of the present invention, which is more particularly set forth in the appended claims.

What is claimed is:

1. An instruction pipeline for one or more processors comprising:
   a scheduler;
   a multiplexer coupled to an output of the scheduler;
   a scheduler bypass path coupled to the multiplexer; and
   a logic circuit providing a control signal to the multiplexer to control the multiplexer to pass an instruction on the scheduler bypass path when the scheduler is empty.

2. The instruction pipeline of claim 1, wherein:
   the logic circuit provides the control signal when a set of operands for the instruction are available in one or more operand registers of an execution area of the instruction pipeline; and
   the scheduler bypass path bypasses a reservation station.

3. The instruction pipeline of claim 1, further comprising:
   one or more functional processing units, wherein the logic circuit provides the control signal when there is sufficient available space for the instruction in the one or more functional processing units; and
   a dispatch buffer, wherein an output of the dispatch buffer is provided to the one or more functional processing units in response to the control signal.

4. The instruction pipeline of claim 3, wherein:
the output of the dispatch buffer is provided to the one or more functional processing units using a delayed reservation station ready signal.

5. The instruction pipeline of claim 1, wherein:
the instruction is ready for execution during a first clock cycle;
a wakeup signal is received during the first clock cycle, the wakeup signal indicating that a set of operands for a second instruction are available; and
the second instruction is older than the instruction.

6. The instruction pipeline of claim 1, wherein:
the scheduler is determined to be empty during a first clock cycle;
the control signal is generated during the first clock cycle based at least in part on determining that the scheduler is empty;
the control signal is latched based at least in part on generating the control signal; and
the instruction is passed on the scheduler bypass path during a second clock cycle based at least in part on the control signal being latched, the second clock cycle being after the first clock cycle.

7. The instruction pipeline of claim 1, further comprising:
an execution area of the instruction pipeline;
a dispatch buffer;
a second multiplexer coupled to an output of the dispatch buffer;
a dispatch buffer bypass path coupled to the second multiplexer; and
a second logic circuit providing a second control signal to the second multiplexer to control the second multiplexer to pass a second instruction on the dispatch buffer bypass path when the dispatch buffer is empty and a full set of operands for the second instruction are available in one or more operand registers of the execution area of the instruction pipeline.

8. A method comprising:
detecting that a scheduler is empty;
signaling, based at least in part on detecting that the scheduler is empty, a control signal to a multiplexer, the multiplexer being coupled to an output of the scheduler; and
passing, based at least in part on signaling the control signal, an instruction on a scheduler bypass path, the scheduler bypass path being coupled to the multiplexer.

9. The method of claim 8, further comprising:
detecting that a set of operands for the instruction is available in one or more operand registers, wherein passing the instruction on the scheduler bypass path is based at least in part on detecting that the set of operands for the instruction is available.

10. The method of claim 8, further comprising:
detecting that an amount of available space in one or more functional processing units is sufficient for the instruction, wherein passing the instruction on the scheduler bypass path comprises providing an output of a dispatch buffer to the one or more functional processing units.

11. The method of claim 10, wherein providing the output to the one or more functional processing units comprises:
passing the output of the dispatch buffer through a delay circuit or a clocked latch.

12. The method of claim 8, further comprising:
executing, in a clock cycle, the instruction;
receiving, in the clock cycle, a wakeup signal indicating that a set of operands for a second instruction are available; and
executing, after executing the instruction, the second instruction, the second instruction being older than the instruction.

13. The method of claim 8, further comprising:
generating, during a first clock cycle, the control signal based at least in part on determining that the scheduler is empty; and
latching the control signal based at least in part on generating the control signal; and
wherein:
the scheduler being empty is determined during the first clock cycle; and
the instruction is passed on the scheduler bypass path during a second clock cycle after the first clock cycle, the instruction being passed on the scheduler bypass path based at least in part on the control signal being latched.

14. The method of claim 8, further comprising:
detecting that a dispatch buffer is empty;
detecting that a full set of operands for a second instruction are available in one or more operand registers of an execution area of an instruction pipeline;
signaling, based at least in part on detecting that the dispatch buffer is empty and detecting that the full set of operands for the second instruction are available, a second control signal to a second multiplexer, the second multiplexer being coupled to an output of the dispatch buffer; and
passing, based at least in part on signaling the control signal, the second instruction on a dispatch buffer bypass path, the dispatch buffer bypass path being coupled to the second multiplexer.

* * * * *